(12) United States Patent
Altamirano et al.

(10) Patent No.: US 10,740,730 B2
(45) Date of Patent: Aug. 11, 2020

(54) MANAGING A WORKFLOW FOR AN OILFIELD OPERATION

(71) Applicant: Schlumberger Technology Corporation, Sugar Land, TX (US)

(72) Inventors: Arturo E. Altamirano, Fresno, TX (US); Brian Goddard, Sugar Land, TX (US); Yang Chen, Houston, TX (US); Chuanqing Lu, Sugar Land, TX (US); Hubertus V. Thomeer, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 13/931,328

(22) Filed: Jun. 28, 2013

(65) Prior Publication Data

US 2013/0290064 A1 Oct. 31, 2013

Related U.S. Application Data

(63) Continuation-in-part of application No. 13/341,903, filed on Dec. 30, 2011, now Pat. No. 9,324,049.
(Continued)

(51) Int. Cl.
*G06Q 30/00* (2012.01)
*G06Q 10/00* (2012.01)
*G06Q 10/06* (2012.01)
*G06Q 30/06* (2012.01)
*E21B 41/00* (2006.01)
*E21B 43/26* (2006.01)
(Continued)

(52) U.S. Cl.
CPC .......... *G06Q 10/20* (2013.01); *E21B 41/0092* (2013.01); *G06Q 10/06316* (2013.01); *G06Q 30/06* (2013.01); *E21B 43/16* (2013.01); *E21B 43/25* (2013.01); *E21B 43/26* (2013.01); *E21B 43/267* (2013.01)

(58) Field of Classification Search
CPC .......... G06Q 30/0255; G06Q 30/0235; G06Q 10/105; G06Q 10/103; G06Q 10/067; G06Q 30/02; G06Q 10/06315; G06Q 40/00; G06Q 30/00; G06Q 30/06; H04Q 7/20
USPC ................................................ 705/7.11–7.42
See application file for complete search history.

(56) References Cited

U.S. PATENT DOCUMENTS 4,551,719 A 11/1985 Carlin et al.
5,829,552 A 11/1998 Fortunato
(Continued)

OTHER PUBLICATIONS

Weltevrede et al., A Guided Workflows Approach to Oil Field Management; Society of Petroleum Engineers, SPE Intelligent Energy Conference and Exhibition, Mar. 23-25, Utrecht, The Netherlands, 2010 (Year: 2010).*

*Primary Examiner* — Patricia H Munson
*Assistant Examiner* — Uche Byrd
(74) *Attorney, Agent, or Firm* — Cathy Hewitt (57) ABSTRACT

Various implementations described herein are directed to a method for managing a workflow for an oilfield operation. The method may include receiving a request to perform the task workflow. The method may also include loading an adapted task workflow based on historical information. The method may further include receiving an input pertaining to one or more tasks of the adapted task workflow. In addition, the method may include determining whether the one or more tasks have been completed based on the received input.

19 Claims, 4 Drawing Sheets

Related U.S. Application Data (60) Provisional application No. 61/428,376, filed on Dec. 30, 2010.

(51) Int. Cl.

| | | |
|---|---|---|
| *E21B 43/267* | (2006.01) | |
| *E21B 43/25* | (2006.01) | |
| *E21B 43/16* | (2006.01) | |

(56) References Cited

U.S. PATENT DOCUMENTS

| | | |
|---|---|---|
| 6,415,979 B1 | 7/2002 | Allard |
| 6,505,145 B1 | 1/2003 | Bjornson |
| 6,845,311 B1 | 1/2005 | Stratton et al. |
| 6,868,397 B1 | 3/2005 | McCaslin |
| 6,871,712 B2 | 3/2005 | Koch et al. |
| 6,952,680 B1 | 10/2005 | Melby et al. |
| 6,967,589 B1 | 11/2005 | Peters |
| 6,985,750 B1 | 1/2006 | Vicknair et al. |
| 7,308,331 B2 | 12/2007 | Bjornson |
| 7,584,165 B2 | 9/2009 | Buchan |
| 7,711,486 B2 | 5/2010 | Thigpen et al. |
| 7,845,413 B2 | 12/2010 | Shampine et al. |
| 8,063,734 B2 | 11/2011 | Conforti |
| 8,868,301 B2 | 10/2014 | Self et al. |
| 9,008,913 B1 | 4/2015 | Sears et al. |
| 9,116,787 B1 | 8/2015 | Johnson |
| 2002/0052769 A1* | 5/2002 | Navani et al. ............... 705/7 |
| 2002/0059320 A1 | 5/2002 | Tamaru |
| 2002/0156582 A1 | 10/2002 | Newman |
| 2002/0165723 A1 | 11/2002 | Kroeger |
| 2003/0069648 A1 | 4/2003 | Douglas et al. |
| 2003/0088534 A1* | 5/2003 | Kalantar et al. ............ 706/50 |
| 2003/0163783 A1 | 8/2003 | Chikirivao et al. |
| 2003/0167238 A1 | 9/2003 | Zeif |
| 2003/0187865 A1 | 10/2003 | Frisina |
| 2003/0196798 A1 | 10/2003 | Newman |
| 2003/0198188 A1 | 10/2003 | Castlebury et al. |
| 2004/0073468 A1 | 4/2004 | Vyas et al. |
| 2004/0078306 A1 | 4/2004 | Whiteley et al. |
| 2004/0153245 A1 | 8/2004 | Womer et al. |
| 2004/0236620 A1 | 11/2004 | Chauhan et al. |
| 2005/0004735 A1 | 1/2005 | Kelly et al. |
| 2005/0114158 A1 | 5/2005 | Albaugh et al. |
| 2005/0131729 A1 | 6/2005 | Melby et al. |
| 2005/0134115 A1 | 6/2005 | Betts, Jr. et al. |
| 2005/0222813 A1 | 10/2005 | Bjornson |
| 2005/0222889 A1 | 10/2005 | Lai et al. |
| 2005/0264396 A1 | 12/2005 | Horkavi et al. |
| 2006/0041845 A1 | 2/2006 | Ferguson et al. |
| 2006/0047377 A1 | 3/2006 | Ferguson et al. |
| 2006/0053075 A1 | 3/2006 | Roth et al. |
| 2006/0059490 A1 | 3/2006 | Knapp et al. |
| 2006/0069605 A1* | 3/2006 | Hatoun .............. G06Q 10/06 705/7.15 |
| 2006/0080063 A1 | 4/2006 | Vaughn |
| 2006/0097854 A1 | 5/2006 | Basu et al. |
| 2006/0106641 A1 | 5/2006 | Bartsch et al. |
| 2006/0126608 A1 | 6/2006 | Pereira et al. |
| 2006/0173600 A1 | 8/2006 | Dietsch et al. |
| 2007/0001826 A1 | 1/2007 | Lanier et al. |
| 2007/0067196 A1 | 3/2007 | Usui |
| 2007/0124220 A1 | 5/2007 | Griggs et al. |
| 2007/0174152 A1 | 7/2007 | Bjornberg et al. |
| 2007/0233534 A1 | 10/2007 | Martin et al. |
| 2007/0277982 A1 | 12/2007 | Shampine et al. |
| 2008/0077299 A1 | 3/2008 | Arshad et al. |
| 2008/0086509 A1 | 4/2008 | Wallace |
| 2008/0091496 A1* | 4/2008 | Gurpinar ............ G06Q 10/06 705/7.13 |
| 2008/0109122 A1 | 5/2008 | Ferguson et al. |
| 2008/0126168 A1 | 5/2008 | Carney et al. |
| 2008/0154691 A1 | 6/2008 | Wellman et al. |
| 2008/0162248 A1* | 7/2008 | Vachon et al. ................ 705/9 |
| 2008/0201388 A1 | 8/2008 | Wood et al. |
| 2008/0201728 A1 | 8/2008 | Midttun et al. |
| 2008/0257544 A1 | 10/2008 | Thigpen et al. |
| 2008/0258890 A1 | 10/2008 | Follmer et al. |
| 2008/0262736 A1 | 10/2008 | Thigpen et al. |
| 2008/0301296 A1 | 12/2008 | York |
| 2008/0306803 A1* | 12/2008 | Vaal ..................... E21B 41/00 705/7.26 |
| 2009/0005927 A1 | 1/2009 | Schlatre et al. |
| 2009/0024442 A1 | 1/2009 | Brink et al. |
| 2009/0099898 A1 | 4/2009 | Ehrman et al. |
| 2009/0125367 A1 | 5/2009 | Brink et al. |
| 2009/0157590 A1 | 6/2009 | Mijares et al. |
| 2009/0204466 A1 | 8/2009 | Nielsen et al. |
| 2009/0254403 A1 | 10/2009 | Nagalla et al. |
| 2009/0288018 A1 | 11/2009 | Paliwal et al. |
| 2010/0023156 A1 | 1/2010 | Trepina et al. |
| 2010/0082842 A1 | 4/2010 | Lavrov et al. |
| 2010/0088141 A1 | 4/2010 | Hill |
| 2010/0179709 A1 | 7/2010 | Abshire |
| 2010/0198651 A1 | 8/2010 | Johnson et al. |
| 2010/0217554 A1 | 8/2010 | Knight et al. |
| 2010/0250139 A1 | 9/2010 | Hobbs et al. |
| 2010/0299172 A1 | 11/2010 | Nottoli et al. |
| 2010/0312605 A1 | 12/2010 | Mitchell et al. |
| 2011/0071963 A1 | 3/2011 | Piovesan et al. |
| 2011/0087891 A1 | 4/2011 | Fries et al. |
| 2011/0153541 A1 | 6/2011 | Koch et al. |
| 2011/0161227 A1 | 6/2011 | Santo, Jr. |
| 2011/0178611 A1 | 7/2011 | Daraiseh et al. |
| 2012/0001876 A1 | 1/2012 | Chervenka et al. |
| 2012/0026002 A1 | 2/2012 | Vu et al. |
| 2012/0050063 A1 | 3/2012 | Bahorich et al. |
| 2012/0050521 A1 | 3/2012 | Fitzpatrick et al. |
| 2012/0054270 A1 | 3/2012 | Foreman et al. |
| 2012/0084366 A1 | 4/2012 | Killoran, Jr. et al. |
| 2012/0203588 A1 | 8/2012 | Burri et al. |
| 2012/0330597 A1 | 12/2012 | Lammers |
| 2013/0073343 A1 | 3/2013 | Richardson et al. |
| 2013/0179354 A1 | 7/2013 | Seat |
| 2014/0156195 A1 | 6/2014 | Guglielmo et al. |
| 2014/0379133 A1 | 12/2014 | Toma |
| 2015/0330204 A1 | 11/2015 | Hildebrand et al. |

* cited by examiner

MANAGING A WORKFLOW FOR AN OILFIELD OPERATION

CROSS-REFERENCE TO RELATED APPLICATIONS

This application is a continuation-in-part of co-pending U.S. patent application Ser. No. 13/341,903, filed Dec. 30, 2011, which claims benefit of U.S. Provisional Patent Application Ser. No. 61/428,376, filed Dec. 30, 2010. The above-mentioned related patent applications are herein incorporated by reference in their entirety.

BACKGROUND

Oilfield operations may involve various sub-surface activities used to locate and gather hydrocarbons. Various tools, such as seismic tools, may be used to locate the hydrocarbons. One or more wellsites may be positioned along an oilfield to locate and gather the hydrocarbons from subterranean reservoirs of an oilfield. The wellsites may be provided with tools capable of advancing into the ground and removing hydrocarbons from the subterranean reservoirs. Production facilities may be positioned at surface locations to collect the hydrocarbons from the wellsites. Fluid may be drawn from the subterranean reservoirs and passed to the production facilities via transport mechanisms, such as tubing. Various equipment may be positioned about the oilfield to monitor and manipulate the flow of hydrocarbons from the reservoirs.

In one scenario, one or more tasks may be performed before, during, and/or after the oilfield operations. These tasks may relate to, for example, conducting maintenance and/or inspections of oilfield equipment, managing inventory, tracking containers and/or jobs, or other tasks known to those skilled in the art. In another scenario, results of the tasks may be recorded by a field engineer at the wellsite using a paper form, where the results may be entered via handwritten text.

SUMMARY

Described herein are implementations of various technologies for managing a workflow for an oilfield operation. In one implementation, a method for managing a task workflow for an oilfield operation may include receiving a request to perform the task workflow. The method may also include loading an adapted task workflow based on historical information. The method may further include receiving an input pertaining to one or more tasks of the adapted task workflow. In addition, the method may include determining whether the one or more tasks have been completed based on the received input.

The above referenced summary section is provided to introduce a selection of concepts in a simplified form that are further described below in the detailed description section. The summary is not intended to be used to limit the scope of the claimed subject matter. Furthermore, the claimed subject matter is not limited to implementations that solve disadvantages noted in any part of this disclosure.

BRIEF DESCRIPTION OF THE DRAWINGS

Implementations of various techniques will hereafter be described with reference to the accompanying drawings. It should be understood, however, that the accompanying drawings illustrate various implementations described herein and are not meant to limit the scope of various techniques described herein.

DETAILED DESCRIPTION

The discussion below is directed to certain specific implementations. It is to be understood that the discussion below is for the purpose of enabling a person with ordinary skill in the art to make and use any subject matter defined now or later by the patent "claims" found in any issued patent herein.

It is specifically intended that the claims not be limited to the implementations and illustrations contained herein, but include modified forms of those implementations including portions of the implementations and combinations of elements of different implementations as come within the scope of the following claims.

Reference will now be made in detail to various implementations, examples of which are illustrated in the accompanying drawings and figures. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, circuits and networks have not been described in detail so as not to obscure aspects of the embodiments.

It will also be understood that, although the terms first, second, etc. may be used herein to describe various elements, these elements should not be limited by these terms. These terms are used to distinguish one element from another. For example, a first object could be termed a second object, and, similarly, a second object could be termed a first object, without departing from the scope of the claims. The first object and the second object are both objects, respectively, but they are not to be considered the same object.

The terminology used in the description of the present disclosure herein is for the purpose of describing particular implementations and is not intended to be limiting of the present disclosure. As used in the description of the present disclosure and the appended claims, the singular forms "a," "an" and "the" are intended to include the plural forms as well, unless the context clearly indicates otherwise. It will also be understood that the term "and/or" as used herein refers to and encompasses one or more possible combinations of one or more of the associated listed items. It will be further understood that the terms "includes" and/or "including," when used in this specification, specify the presence of stated features, integers, operations, elements, and/or components, but do not preclude the presence or addition of one or more other features, integers, operations, elements, components and/or groups thereof.

As used herein, the terms "up" and "down"; "upper" and "lower"; "upwardly" and "downwardly"; "below" and "above"; and other similar terms indicating relative positions above or below a given point or element may be used in connection with some implementations of various technologies described herein. However, when applied to equipment and methods for use in wells that are deviated or horizontal, or when applied to equipment and methods that when arranged in a well are in a deviated or horizontal orientation, such terms may refer to a left to right, right to left, or other relationships as appropriate.

It should also be noted that in the development of any such actual implementation, numerous decisions specific to circumstance may be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

The terminology and phraseology used herein is solely used for descriptive purposes and should not be construed as limiting in scope. Language such as "having," "containing," or "involving," and variations thereof, is intended to be broad and encompass the subject matter listed thereafter, equivalents, and additional subject matter not recited.

Furthermore, the description and examples are presented solely for the purpose of illustrating the different embodiments, and should not be construed as a limitation to the scope and applicability. While any composition or structure may be described herein as having certain materials, it should be understood that the composition could optionally include two or more different materials. In addition, the composition or structure may also include some components other than the ones already cited. Although some of the following discussion emphasizes the use of the systems at a wellsite to facilitate and/or assist in managing wellsite operations, it should be understood that the systems described herein may be used at locations other than a wellsite. For example, the systems may be used to monitor equipment at construction sites, mines or the like. Although some of the following discussion emphasizes fracturing, the equipment, compositions and methods described herein may be used in any well treatment in which diversion is used. Examples include fracturing, acidizing, water control, chemical treatments, and wellbore fluid isolation and containment. Various implementations described herein are for hydrocarbon production wells, but it is to be understood that they may be used for wells for production of other fluids, such as water or carbon dioxide, or, for example, for injection or storage wells. It should also be understood that throughout this specification, when a range is described as being useful, or suitable, or the like, it is intended that any value within the range, including the end points, is to be considered as having been stated. Furthermore, respective numerical values should be read once as modified by the term "about" (unless already expressly so modified) and then read again as not to be so modified unless otherwise stated in context. For example, "a range of from 1 to 10" is to be read as indicating a respective possible number along the continuum between about 1 and about 10. In other words, when a certain range is expressed, even if a few specific data points are explicitly identified or referred to within the range, or even when no data points are referred to within the range, it is to be understood that the inventors appreciate and understand that any data points within the range are to be considered to have been specified, and that the inventors have possession of the entire range and points within the range.

The following paragraphs provide a brief summary of various technologies and techniques directed at managing a workflow for an oilfield operation described herein.

In one implementation, one or more task workflows may be composed of one or more tasks for a user to complete in order to help conduct an oilfield operation. For example, for an oilfield operation such as a cementing operation, a user may perform a maintenance workflow, where the maintenance workflow is composed of maintenance tasks used to conduct maintenance on cementing pumps.

A dedicated workflow application may be stored on a communications interface device. A user may initially log into the workflow application. In response, the workflow application may display a number of task workflows which may be available for selection by the user. Using an input device of the communications interface device, the user may select a task workflow, e.g., for an oilfield operation.

In one implementation, the workflow application may adapt the task workflow based on historical information. Historical information may include a record of the tasks of the task workflow that have or have not been completed for the oilfield operation. Historical information may also include a record of tasks which may be designated as completed if performed a predetermined number of times during a predetermined period of time, which may be referred to as periodic tasks. Historical information may further include a record of tasks which have been completed and removed from the task workflow for the oilfield operation, but that may be added again to the task workflow based on one or more conditions. In one implementation, the workflow application may download the historical information from a central hub.

The communications interface device may display the adapted task workflow. The workflow application may receive a user input corresponding to one or more tasks of the adapted task workflow. The user input may be received via the input device of the communications interface device.

In one implementation, the communications interface device may periodically store the user input of the adapted task workflow at the central hub at specified periods of time. The communications interface device may also periodically send an update of the tasks completed by the user to the central hub, thereby providing the central hub with at least a near-real time account of the progress of the adapted task workflow.

In another implementation, if the user provides a numerical value corresponding to one or more tasks of the adapted task workflow, and that numerical value falls outside of a predetermined range of values, then the communications interface device may provide an alert to the user via its output device.

In yet another implementation, if the user provides a "fail" designation as input for one or more tasks of the adapted task workflow, the workflow application may add one or more previously completed tasks to the adapted task workflow.

In still another implementation, the workflow application may determine whether the one or more tasks corresponding to the user input have been completed. For example, maintenance tasks which received a "pass designation" as user input may be considered to be completed. In another example, tasks receiving a numerical value as user input that fall within a specified range may be considered to be completed. On the other hand, for tasks receiving numerical values falling outside of the specified range, a trend analysis may be performed. For the trend analysis, the user may view the completion history for the task and whether the numerical value is out of the ordinary for past oilfield operations.

Various implementations described above will now be described in more detail with reference to FIGS. 1-4.

Oilfield Operation

As will be described later, one or more workflows composed of one or more tasks may be performed to help conduct an oilfield operation, which may be used to locate and gather hydrocarbons using one or more pieces of oilfield equipment. For example, oilfield operations may include cementing operations, hydraulic fracturing, acid stimulation, or other operations known to those skilled in the art.

Oilfield equipment used to implement the oilfield operations may include cementing pumps, positive displacement pumps (or reciprocating pumps), rig equipment, or any other equipment known to those skilled in the art. In one implementation, a cementing pump may be used in cementing operations. In particular, during a construction of subterranean wells, a cementing pump may be used to place a tubular body in a wellbore during and after drilling. The tubular body may include drill pipe, casing, liner, coiled tubing, or combinations thereof. A plurality of tubular bodies may be placed sequentially and concentrically, with respective successive tubular bodies having a smaller diameter than the previous tubular body, set at selected depths as drilling progresses. The tubular body may support the wellbore and act as a conduit through which desirable fluids from the well may travel and be collected. The tubular body may be secured in the wellbore by a cement sheath. The cement sheath may provide mechanical support and hydraulic isolation between zones or layers that the wellbore penetrates. The latter function may prevent hydraulic communication between zones, which could cause contamination. For example, the cement sheath may block fluids from oil or gas zones from entering a water table and polluting drinking water. In addition, isolating a gas-producing zone from an oil-producing zone may increase efficiency of the wellbore's production.

In another implementation, a positive displacement pump may be used in oilfield operations to pump fluids into a wellbore and a surrounding reservoir. In particular, the positive displacement pump may be used in hydraulic fracturing, where a fluid may be pumped down a wellbore at a flow rate and pressure sufficient to fracture a subterranean formation.

Figure 1:
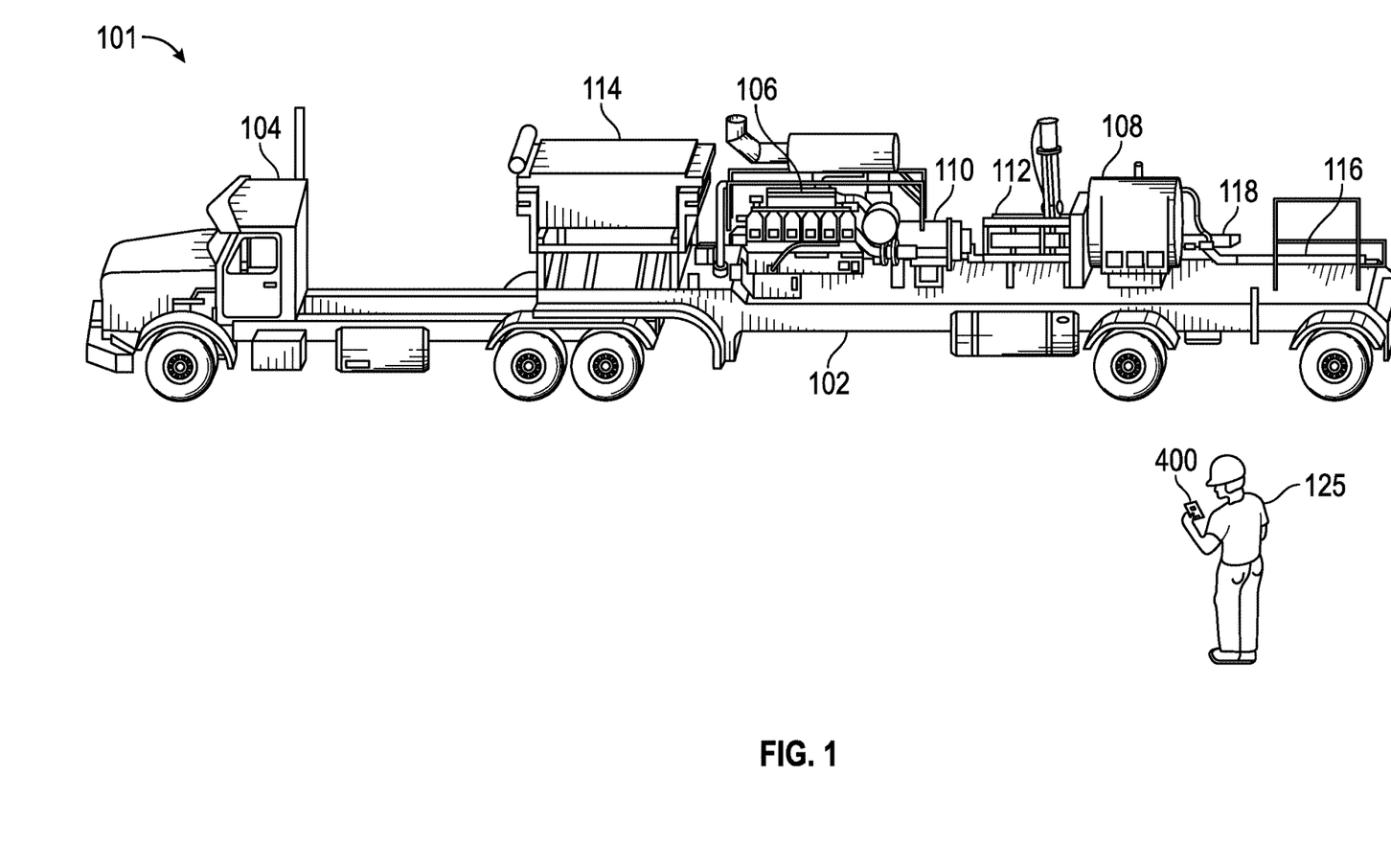
FIG. 1 illustrates a side view of a piece of oilfield equipment in connection with implementations of various techniques described herein.

FIG. 1 illustrates a side view of a piece of oilfield equipment in connection with implementations of various techniques described herein. FIG. 1 illustrates a pumping unit 101, which may be used for pumping a fluid from a well surface to a wellbore. As shown, the pumping unit 101 may include a plunger pump and fluid end 108 mounted on a standard trailer 102 for ease of transportation by a tractor 104. The pumping unit 101 may include a prime mover 106 that drives a crankshaft through a transmission 110 and a drive shaft 112. The crankshaft, in turn, may drive one or more plungers toward and away from a chamber in the pump fluid end 108 in order to create pressure oscillations of high and low pressures in the chamber. These pressure oscillations may allow the pump to receive a fluid at a low pressure and discharge it at a high pressure via one way valves (also called check valves). Also connected to the prime mover 106 may be a radiator 114 for cooling the prime mover 106. In addition, the pump fluid end 108 may include an intake pipe 116 for receiving fluid at a low pressure and a discharge pipe 118 for discharging fluid at a high pressure.

Figure 2:
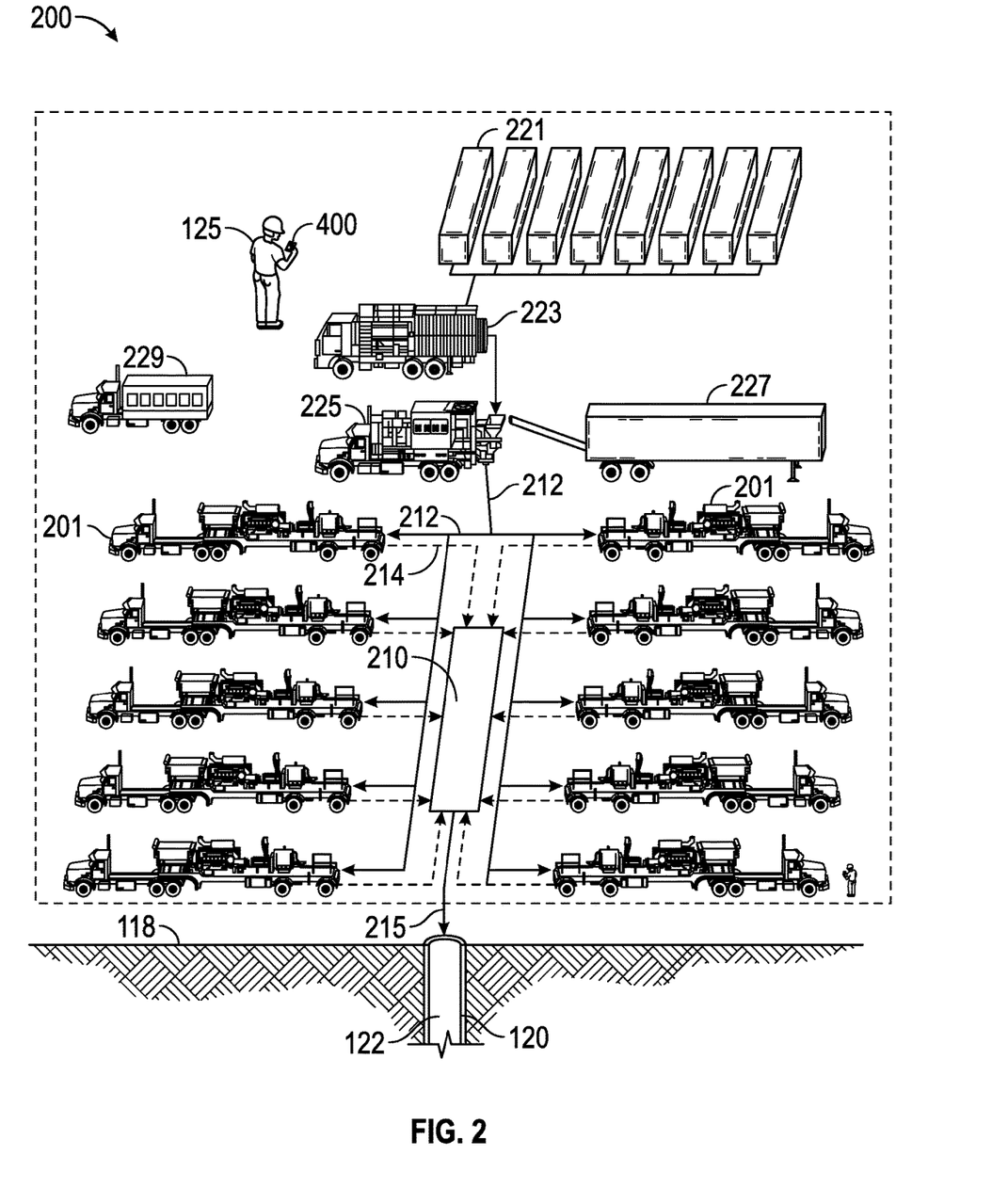
FIG. 2 illustrates a view of an oilfield operation in connection with implementations of various techniques described herein.

FIG. 2 illustrates a view of an oilfield operation in connection with implementations of various techniques described herein. A pumping system 200 is shown, which may be used for pumping a fluid from a surface 118 of a well 120 to a wellbore 122 during the oilfield operation. The oilfield operation may be a hydraulic fracturing operation, and the fluid pumped may be a fracturing fluid. As shown, the pumping system 200 may include a plurality of water tanks 221, which may feed water to a gel hydration unit 223. The gel hydration unit 223 may combine water from the tanks 221 with a gelling agent to form a gel. The gel may then be sent to a blender 225 where it may be mixed with a proppant from a proppant transport 227 to form a fracturing fluid. The gelling agent may increase the viscosity of the fracturing fluid and allow the proppant to be suspended in the fracturing fluid. It may also act as a friction reducing agent to allow higher pump rates with less frictional pressure.

The fracturing fluid may then be pumped at low pressure (for example, around 60 to 120 psi) from the blender 225 to a plurality of pumping units 201, as shown by solid lines 212. Respective pumping units 201 may have the same or a similar configuration as the pumping unit 101 shown in FIG. 1. As shown in FIG. 2, the pumping units 201 may receive the fracturing fluid at a low pressure and discharge it to a common manifold 210 (sometimes called a missile trailer or missile) at a high pressure as shown by dashed lines 214. The missile 210 may then direct the fracturing fluid from the pumping units 201 to the wellbore 122 as shown by solid line 215.

In the hydraulic fracturing operation, an estimate of the well pressure and the flow rate to create the desired side fractures in the wellbore may be calculated. Based on this calculation, the amount of hydraulic horsepower from the pumping system used to carry out the fracturing operation may be determined. For example, if it is estimated that the well pressure and the flow rate are 6000 psi (pounds per square inch) and 68 BPM (Barrels Per Minute), then the pump system 200 may supply 10,000 hydraulic horsepower to the fracturing fluid (i.e., 6000*68/40.8).

In one implementation, the prime mover 106 in a respective pumping unit 201 may be an engine with a maximum rating of 2250 brake horsepower, which, when accounting for losses (which may be about 10% for plunger pumps in hydraulic fracturing operations), may allow the respective pumping unit 201 to supply a maximum of about 2025 hydraulic horsepower to the fracturing fluid. Therefore, in order to supply 10,000 hydraulic horsepower to a fracturing fluid, the pump system 200 of FIG. 2 may have at least five pumping units 201.

In order to prevent an overload of the transmission 110, and for various other reasons, the pumping units 201 may operate under their respective maximum operating capacity. Operating the pumps under their respective operating capacity may allow for one pump to fail and the remaining pumps to be run at a higher speed in order to make up for the absence of the failed pump.

As such, where a fracturing operation may use 10,000 hydraulic horsepower, bringing ten pumping units 201 to the wellsite may enable respective pump engines 106 to be operated at about 1111 brake horsepower (about half of its maximum) in order to supply 1000 hydraulic horsepower individually and 10,000 hydraulic horsepower collectively to the fracturing fluid. On the other hand, if ten pumping units 201 may be brought to the wellsite, or if one of the pumps may fail, then the ten pump engines 106 may respectively operate at about 1234 brake horsepower in order to supply the 10,000 hydraulic horsepower to the fracturing fluid. As shown, a computerized control system 229 may be employed to direct the entire pump system 200 for the duration of the fracturing operation.

The oilfield configuration of FIG. 2 is intended to provide a brief description of an example of a field usable with oilfield equipment. At least part of the oilfield in FIG. 2 may be on land, water, and/or sea. Also, while a single oilfield measured at a single location is depicted, one or more oilfields may be used with one or more processing facilities and one or more wellsites.

Computing Network

Figure 3:
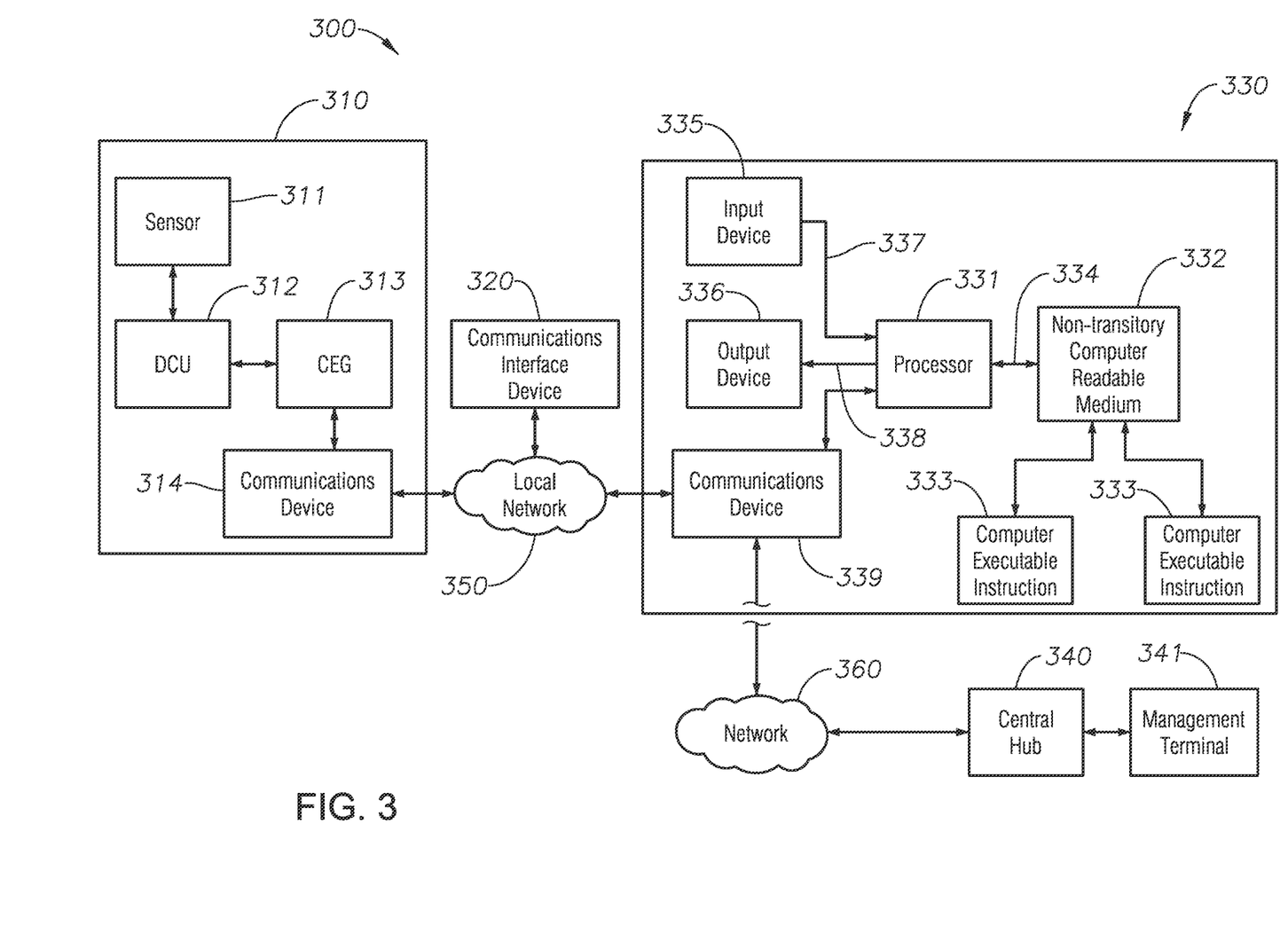
FIG. 3 illustrates a computing network in connection with implementations of various techniques described herein.

In one implementation, a computing network may be used to facilitate an oilfield operation, such as the oilfield operations discussed with respect to FIGS. 1 and 2. In particular, as will be described later, the computing network may be used to perform one or more workflows composed of one or more tasks, where the tasks may help conduct the oilfield operation. FIG. 3 illustrates a computing network 300 in connection with implementations of various techniques described herein. The computing network 300 may include oilfield equipment 310, communications interface device 320, a local server 330, and a central hub 340.

Oilfield Equipment

In one implementation, the oilfield equipment 310 may include a plurality of sensors 311, a data collection unit ("DCU") 312, a controller area network to Ethernet gateway (CEG) 313, and a communications device 314. In particular, the oilfield equipment 310 may be any type of equipment known to those skilled in the art, such as those discussed earlier with respect to FIGS. 1 and 2.

The plurality of sensors 311 may detect and record one or more types of data indicative of an operating status of the oilfield equipment 310. The operating status may indicate that the oilfield equipment 310 are operating or not operating. Its data may indicate readings for pressure, temperature, flow rate, hours of operation, start time, of operation, and end time of operation, for example. The data may be created through operation or lack of operation of the oilfield equipment 310, which operate within ranges of pressures, temperatures, and flow rates, for example. The data may correspond to equipment pressure, such as input pressure, output pressure, pressure oscillation, for example; data indicative of equipment flow rate, for instance the number of barrels of fluid per minute passing through a pump; and data indicative of equipment temperature. The oilfield equipment 310 may also operate continuously, for predetermined periods of time, or for indeterminate periods of time where the indeterminate periods of time may be caused by unplanned interruptions in operation. The plurality of sensors 311 receiving data may then transmit the data to the DCU 312.

The plurality of sensors 311 may be provided within the DCU 312 or may be external to the DCU 312 and within the oilfield equipment 310. The plurality of sensors 311 may be implemented as motion transducers, pressure potentiometers, capacitance transducers, piezoresistive sensors, electropneumatic transducers, temperature sensors, accelerometers, and flow rate sensors, for example. The plurality of sensors 311 may measure data in an analogue format, such as a wave form. In one implementation, the plurality of sensors 311 may include one or more of the sensor types described above for the oilfield equipment 310.

The DCU 312 may receive data from one or more of the plurality of sensors 311, which may be in the form of one or more real-time analogue data streams. The DCU 312 may be provided with one or more processors, non-transitory computer readable medium, computer executable instructions, an input device for receiving data, and an output device for transmitting the data from the plurality of sensors 311 to the CEG 313. The DCU 312 may aggregate the data from the plurality of sensors 311 and transmit the received data to the CEG 313. The CEG 313 may encapsulate the data in a networking protocol framework, such as TCP/IP and transmit the encapsulated data to a local area network (LAN) 350 via its communications device 314. The communications device 314 may be implemented similarly to communications device 339, described below.

Local Server

In one implementation, the local server 330 may communicate with the central hub 340 via a wide area network (WAN) 360. In a further implementation, the WAN 360 may be implemented using a satellite network, the Internet, a local network, a metropolitan network, a wireless network, a cellular network, a GSM-network, a CDMA network, a 3G network, a 4G network, a radio network, an optical network, a cable network, a public switched telephone network, an Ethernet network, combinations thereof, or any other communications implementation known to those skilled in the art. The WAN 360 may interface with the local server 330 in a variety of ways, such as by optical and/or electronic interfaces, and may use a plurality of network topographies and protocols, such as Ethernet, TCP/IP, circuit switched paths, file transfer protocol, packet switched wide area networks, or combinations thereof. The WAN 360 may also permit bi-directional communication of information and/or data between the local server 330 and the central hub 340.

The local server 330 may also communicate with the communications interface device 320 and the oilfield equipment 310 via the LAN 350. The LAN 350 may be implemented using a high-speed communication link, such as a fiber optic cable, wireless point to point communicating link, or an IEEE standard 802.11a, b, n or g communication link, or any other communications implementation known to those skilled in the art. In another implementation, through its CEG 313 and communications device 314, the oilfield equipment 310 may communicate with the communications interface device 320 via the LAN 350, and may also communicate with the central hub 340 via the local server 330 and the WAN 360.

In another implementation, the oilfield equipment 310, the communications interface device 320, and the local server 330 may be located within a particular limited district such as a wellsite or rig. A particular limited district may have at least one local server 330. The central hub 340 may be remote from the particular limited district and communicate with the local server 330 via the WAN 360. In a further implementation, the oilfield equipment 310, the communications interface device 320, and the local server 330 may be located offshore, while the central hub 340 may be located onshore. In yet another implementation, the central hub 340 may be in communication with a second limited district of oilfield equipment, communications interface device, and local server via the WAN 360. The local server 330 may be able to access data located at the central hub 340 and may be limited to accessing data applicable to its particular limited district.

The local server 330 may include a processor 331, a non-transitory computer readable medium 332, and computer executable instructions 333 stored on the non-transitory computer readable medium 332. The one or more processors 331 may be implemented as a single processor 331 or multiple processors 331 working together or independently to execute the computer executable instructions described herein. Implementations of the one or more processor 331 may include a digital signal processor (DSP), a central processing unit (CPU), a microprocessor, a multi-core processor, and combinations thereof. The processor 331 may be coupled to the non-transitory computer readable medium 332. The non-transitory computer readable medium 332 may be implemented as random access memory, read only memory, flash memory or the like, and may take the form of a magnetic device, optical device or the like. The non-transitory computer readable medium 332 may be a single non-transitory computer readable medium or multiple non-transitory computer readable mediums functioning logically together or independently.

The processor 331 may be coupled to and configured to communicate with the non-transitory computer readable medium 332 via a path 334 which may be implemented as a data bus, for example. The one or more processor 331 may be capable of communicating with an input device 335 and an output device 336 via paths 339 and 338, respectively. Paths 337 and 338 may be implemented similarly to or differently from path 334. For example, paths 337 and 338 may have a same or different number of wires and may or may not include a multidrop topology, a daisy chain topology, or one or more switched hubs. The paths 334, 337, and 338 may be a serial topology, a parallel topology, a proprietary topology, or combination thereof. The one or more processor 331 may be further capable of interfacing and/or communicating with one or more WAN 360, via the communications device 339 such as by exchanging electronic, digital and/or optical signals via the communications device 339 using a network protocol such as TCP/IP. The communications device 339 may be a wireless modem, digital subscriber line modem, cable modem, network bridge, Ethernet switch, or any other suitable communications device capable of communicating between the one or more processor 331 and the networks 350 and 360. For more than one processor 331, they may be located remotely from one another, located in the same location, or comprising a unitary multicore processor (not shown). The one or more processors 331 may be capable of reading and/or executing computer executable instructions 333 and/or creating, manipulating, altering, and storing computer data structures into the non-transitory computer readable medium 332.

The non-transitory computer readable medium 332 may store computer executable instructions 333 and may be implemented as any conventional non-transitory computer readable medium 332, such as random access memory (RAM), a hard drive, a hard drive array, a solid state drive, a flash drive, a memory card, a CD-ROM, a DVD-ROM, a BLU-RAY, a floppy disk, an optical drive, and combinations thereof. When more than one non-transitory computer readable medium 332 may be used, the non-transitory computer readable medium 332 may be located in the same physical location as the one or more processors 331, and non-transitory computer readable medium 332 may be located in a remote physical location from the one or more processors 331. The physical location(s) of the non-transitory computer readable medium 332 may be varied, and the non-transitory computer readable medium 332 may be implemented as a "cloud memory," i.e., non-transitory computer readable medium 332 which may be partially, or completely, based on or accessed using the one or more WAN 360, so long as at least one of the non-transitory computer readable medium 332 is located local to the one or more processor 331. The non-transitory computer readable medium 332 may store computer executable instructions 333 such as an operating system and application programs such as a word processor, for example. The computer executable instructions 333 may be written in any suitable programming language, such as C++, C #, or Java.

The input device 335 may transmit data to the one or more processors 331, and can be implemented as a keyboard, a mouse, a touch-screen, a camera, a cellular phone, a tablet, a smart phone, a personal digital assistant (PDA), a microphone, a network adapter, a camera, a scanner, and combinations thereof. The input device 335 may be located in the same physical location as the one or more processors 331, or may be remotely located and/or partially, or completely, network-based. The input device 335 may communicate with the one or more processor 331 via path 337.

The output device 336 may transmit information from the one or more processors 331 to a user, such that the information can be perceived by the user. For example, the output device 336 may be implemented as a server, a computer monitor, a cell phone, a tablet, a speaker, a website, a PDA, a fax, a printer, a projector, a laptop monitor, and combinations thereof. The output device 336 may communicate with the one or more processor 331 via the path 338.

In another implementation, the local server 330, with the one or more processors 331, the non-transitory computer readable medium 332, the input device 335, the output device 336, and the communications device 339, may be implemented as a computing device. For example, the local server 330 may also implemented together as a laptop, a smartphone, a PDA, a tablet device (such as an iPad), a netbook, a desktop computer, or any other computing device known to those skilled in the art.

Central Hub

The central hub 340 may be implemented similarly to the local server 330. The central hub 340 may be connected via a network to one or more management terminals 341, enabling the transmission of data from a central location through a reliable network connection to the management terminal 341, thereby preventing gaps in the display data on the management terminal 341. In one implementation, the central hub 340 may be implemented as a local server located where a reliable network connection may provide communication between the central hub 340 and the management terminal 341.

The management terminal 341 may be similarly implemented as the local server 330, with the exception that the management terminal 341 may not maintain a connection to a local communications network communicating with the oilfield equipment 310.

Communications Interface Device

The communications interface device 320 may also be implemented similarly to the local server 330. In particular, the communications interface device 320 itself, with one or more processors, a non-transitory computer readable medium, an input device, an output device, a communications device, or combinations thereof, may be implemented as a computing device. For example, the communications interface device 320 may be implemented as a PDA, a laptop, a smartphone, a tablet device (such as an iPad), a netbook, a desktop computer, or any other computing device known to those skilled in the art. In one implementation, the device 320 may be designed to withstand an explosion at a wellsite or rig.

In one implementation, the communications interface device 320 may include a touch screen. In another implementation, the communications interface device 320 may include a camera configured to capture still photos and/or video, a microphone configured to record audio, a bar code reader, an RFID reader, a keypad, a GPS antenna, or combinations thereof. In yet another implementation, the communications interface device 320 may be implemented as a wearable, mobile computing device, such as, but not limited to, GOOGLE GLASS™.

The communications interface device 320 may be configured to communicate via voice over IP (VoIP) through the LAN 350, the local server 330, and/or the WAN 360. In one implementation, a user with the device 320 may be located offshore and may be able to communicate to an onshore location via VoIP. As will be described later, in one implementation, the communications interface device 320 may include software stored in its non-transitory computer readable medium, such as a dedicated workflow application for use in performing one or more workflows.

Adaptable Workflow

In one implementation, one or more task workflows may be composed of one or more tasks for a user to complete in order to help conduct an oilfield operation. For example, for an oilfield operation such as a cementing operation, a user may perform a maintenance workflow, where the maintenance workflow is composed of maintenance tasks used to conduct maintenance on cementing pumps.

In particular, for a given oilfield operation, the task workflows may define, among other things, which tasks to perform, when the tasks may be performed, who may perform the tasks, in what order they may be performed, how information may flow to support the tasks, how the tasks may be tracked, and/or combinations thereof. Task workflows may be used to conduct maintenance and/or inspections of oilfield equipment, manage inventory, track containers, trucks, backhoes, bulldozers, certifications, and/or jobs, conduct training, or any other actions known to those skilled in the art used to help conduct oilfield operations.

A task workflow may have an initial set number of tasks for an oilfield operation, also referred to as a default task workflow. For example, a user may choose to perform maintenance and/or inspections on a piece of oilfield equipment for a new cementing operation, and, in response, the user may be assigned a default maintenance workflow with over two hundred maintenance and/or inspections tasks to complete. In such an example, the default maintenance workflow for cementing equipment may be divided into stages. One stage may involve users starting the default maintenance workflow with maintenance and/or inspections tasks after a previous cementing job has completed. This stage may be followed by another stage involving maintenance and/or inspections tasks with the cementing equipment's engine turned off. This may be followed by yet another stage of maintenance and/or inspections tasks which may be carried out with the cementing equipment's engine turned on. Maintenance and/or inspections tasks performed with the cementing equipment's engine turned off may include checking for leaks, replacing fuel filters, draining water, checking fluid levels, performing repairs, and/or checking service indicators. A final stage may include validating a subset of previously completed maintenance and/or inspections tasks prior to the commencement of a next cementing operation. Completion of the default maintenance workflow may not occur until the two hundred or so maintenance and/or inspections tasks have been completed.

Figure 4:
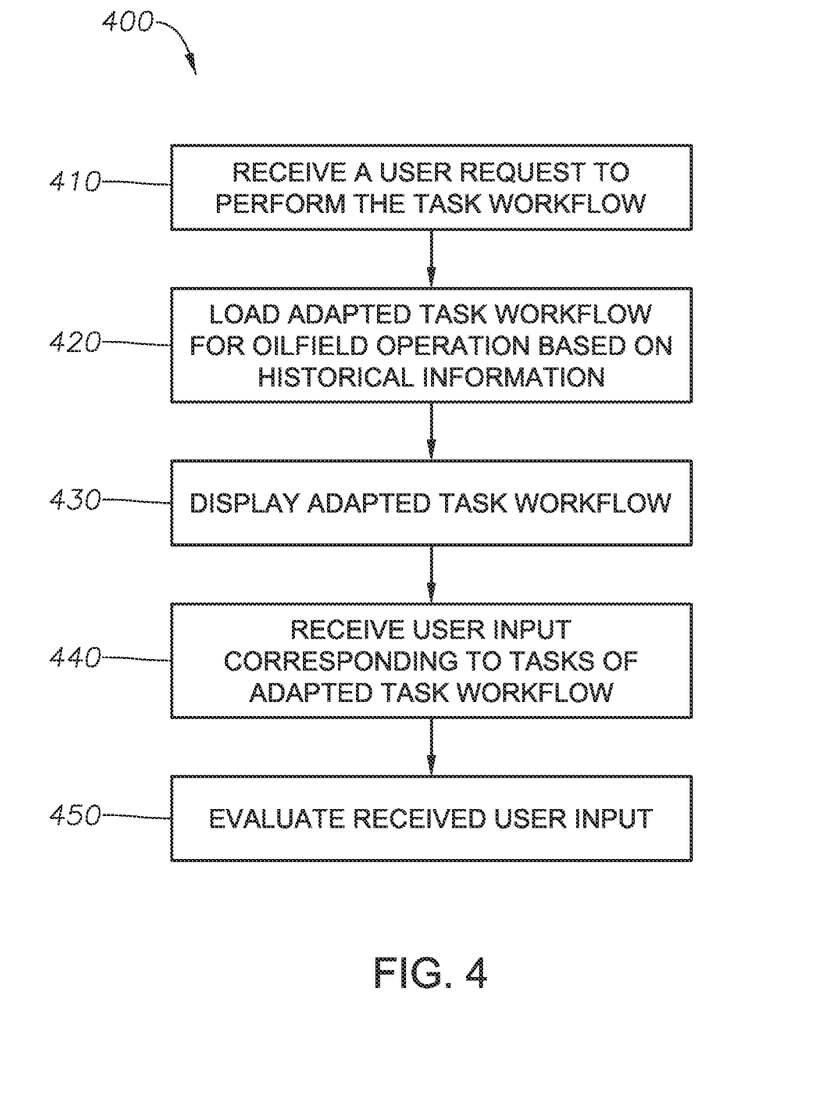
FIG. 4 illustrates a flow diagram of a method for managing a task workflow for an oilfield operation in accordance with implementations of various technologies and techniques described herein.

FIG. 4 illustrates a flow diagram of a method 400 for managing a task workflow for an oilfield operation in accordance with implementations of various technologies and techniques described herein. The task workflow may be composed of one or more tasks used to help conduct the oilfield operation. In one implementation, the method 400 may be performed by the communications interface device 320, such as by a PDA. In particular, the method 400 may be performed by a dedicated workflow application stored on the communications interface device 320. In addition, the workflow application of the device 320 may be used to perform the tasks of the task workflow. It should be understood that while method 400 indicates a particular order of execution of the operations, in some implementations, certain portions of the operations might be executed in a different order. The following description of method 400 is provided with reference to the computing network 300 of FIG. 3.

At block 410, the workflow application may receive a user request to perform the task workflow. In one implementation, a user may initially log into the workflow application. The workflow application may display a number of task workflows which may be available for selection by the user. Using an input device of the communications interface device 320, the user may select a task workflow. The workflow application may receive the user's selection and may load the task workflow, as described below with respect to block 420.

For example, the user may log into the workflow application on a PDA using the PDA's touch screen, where the workflow application may be configured to perform maintenance workflows. The workflow application may display an equipment list via the touch screen, through which the user may select a particular oilfield equipment unit from the list. In one implementation, the equipment list may include identification numbers for respective oilfield equipment units, and the user's selection may be based on a particular equipment unit's identification number. Having received the user's selection, the workflow application may load a maintenance workflow for the particular oilfield equipment unit, as described below with respect to block 420.

At block 420, the workflow application may load an adapted task workflow for the oilfield operation, where the task workflow may be adapted based on historical information. In one implementation, the workflow application may load both a default task workflow and historical information based on the user's selection, and then adapt the default task workflow based on the historical information. In another implementation, the task workflow may have already been adapted based on the historical information when loaded by the workflow application.

The workflow application may use the communications interface device 320 to download the task workflow and/or the historical information from the central hub 340 via the LAN 350, the local server 330, and the WAN 360. In a further implementation, the workflow application may download the task workflow and/or the historical information upon login by the user and/or receiving the user's selection. The local server 330 and/or the communications interface device 320 may also locally store the task workflow and/or the historical information.

Historical information may include a record of the tasks of the task workflow that have or have not been completed for the oilfield operation. Accordingly, the workflow application may adapt the task workflow by removing or marking those tasks which have already been completed for the oilfield operation, thereby producing an adapted task workflow of uncompleted tasks.

For example, the workflow application may remove maintenance and/or inspections tasks which have been completed from the maintenance workflow. In such an example, the workflow application may remove maintenance and/or inspections tasks which have a "pass" designation from the maintenance workflow, producing an adapted maintenance workflow of maintenance and/or inspections tasks that have yet to be completed and/or those with a "fail" designation. In one implementation, the user may designate uncompleted maintenance tasks as "needs attention," as further discussed below.

Historical information may also include a record of tasks which may be designated as completed if performed a predetermined number of times during a predetermined period of time, which may be referred to as periodic tasks. For example, a periodic maintenance task may be designated as completed if the task had been performed once within the previous year. Accordingly, if the historical information shows that the periodic task had been completed for the predetermined number of times during the predetermined period of time, then the periodic task may be removed from the task workflow. In one implementation, the periodic task may be removed from a task workflow for a current oilfield operation even if the periodic task had been completed during a different oilfield operation. For example, the workflow application may remove periodic maintenance tasks from a maintenance workflow for a current cementing operation because they had been completed once during the past year for a previous cementing operation.

Historical information may further include a record of tasks which had been completed and removed from the task workflow for the oilfield operation, but that may be added again to the task workflow based on one or more conditions. For example, the workflow application may add a previously-removed and completed maintenance task to the maintenance workflow because too much time has passed since the maintenance task was last performed.

At block 430, the communications interface device 320 may display the adapted task workflow. In one implementation, the tasks of the adapted task workflow may be organized into groups, such as in terms of the stages described earlier with respect to the cementing operation. In another implementation, a completion history for respective tasks may be available for display to the user. For example, the PDA may display the adapted maintenance workflow, and respective displayed maintenance tasks may have an option to view a history of "pass" or "fail" designations for that task in past oilfield operations. In yet another implementation, help information for respective tasks may be available for display to the user. The help information may be in the form of text, pictures, video, audio, or other implementations known to those skilled in the art.

At block 440, the workflow application may receive a user input corresponding to one or more tasks of the adapted task workflow. The user input may be received via the input device of the communications interface device 320. In one implementation, the user input may include a designation for the tasks, such as "pass," "fail," or "needs attention." In other implementations, the user input may include user comments, media such as video and/or audio, numerical values, and/or combinations thereof. For example, the user input may be current fluid levels obtained via sensors disposed on a cementing pump. In another example, the user input may be a picture file of a portion of the cementing pump and may be attached to a maintenance task designated as "needs attention."

In one implementation, the user may include comments, media files, or other user input for tasks which change in designation to "pass" from "fail" or "needs attention." The comments, media files, or other user input may help to explain how the change in designation occurred and/or how the task was performed.

At block 450, the workflow application may evaluate the received user input. In one implementation, the workflow application may determine whether the one or more tasks corresponding to the user input have been completed. For example, maintenance tasks which received a "pass designation" as user input may be considered to be completed. In another example, tasks receiving a numerical value as user input that fall within a specified range may be considered to be completed. In such an example, for tasks receiving numerical values falling outside of the specified range, a trend analysis may be performed. For the trend analysis, the user may view the completion history for the task and determine whether the numerical value is out of the ordinary for past oilfield operations. If past oilfield operations were performed with such numerical values, then the corresponding task may be considered to be completed. In another implementation, if the user provides a numerical value corresponding to one or more tasks of the adapted task workflow, and that numerical value falls outside of a predetermined range of values, then the communications interface device 320 may provide an alert to the user via its output device. For example, the alert may provide notice to the user of possible issues relating to the oilfield equipment unit. In response, the user may review the completion history and/or perform a trend analysis for the one or more tasks.

In one implementation, the workflow application may adapt the task workflow as tasks may be completed. For example, the workflow application may remove a task once it receives a "pass designation," leaving the tasks yet to be performed, the tasks with a "fail designation," and/or the tasks with a "needs attention" designation. In a further implementation, if the user provides a "fail" designation as input for one or more tasks of the adapted task workflow, the workflow application may add one or more previously completed tasks to the adapted task workflow in response. For example, if the user provides the "fail" designation as a user input to a fifth maintenance task of the adapted maintenance workflow, the maintenance workflow application may add the second and third maintenance tasks to the adapted maintenance workflow for the user to complete again, even though the second and third maintenance tasks may already have "pass" designations.

In one implementation, the communications interface device 320 may periodically store the user input of the adapted task workflow at the central hub 340 at predetermined periods of time. The communications interface device 320 may also periodically send an update of the tasks completed by the user to the central hub 340, thereby providing the central hub 340 with at least a near-real time account of the progress of the adapted task workflow.

For example, the PDA may periodically send its user input and/or an update of maintenance tasks completed by the user, such as the adapted maintenance workflow itself, to the central hub 340 via the LAN 350, the local server 330, and the WAN 360. The PDA may send the user input and/or the update of completed tasks after five minute intervals and/or after five tasks have been completed. In another implementation, the user input and the update of the tasks completed may be locally periodically stored at the communications interface device 320 and/or the local server 330. In particular, the user input and the update of the tasks completed may be locally stored if the WAN 360 loses connectivity. Upon completion of a sufficient number of tasks for the task workflow, the workflow application may generate a final report summarizing the completion of the workflow.

While the foregoing is directed to implementations of various techniques described herein, other and further implementations may be devised without departing from the basic scope thereof, which may be determined by the claims that follow. Although the subject matter has been described in language specific to structural features and/or methodological acts, it is to be understood that the subject matter defined in the appended claims is not limited to the specific features or acts described above. Rather, the specific features and acts described above are disclosed as example forms of implementing the claims.

What is claimed is:

1. A non-transitory computer-readable medium having stored thereon computer-executable instructions which, when executed by a mobile computer, cause the mobile computer to:
   receive a request to wirelessly download a default task workflow and historical information for oilfield pumping equipment used in an oilfield operation from a server computer;
   generate an adapted task workflow by loading the default task workflow and changing the default task workflow based on the historical information such that the adapted task workflow consists of tasks yet to be completed;
   display on a screen of the mobile computer the adapted task workflow in groups of the tasks yet to be completed, wherein each group of tasks yet to be completed comprises maintenance and/or inspection tasks to be performed at a different stage of operations of the oilfield pumping equipment, wherein a first one of the groups of tasks yet to be completed comprises maintenance and/or inspection tasks to be performed with an engine of the oilfield pumping equipment turned off, and wherein a second one of the groups of tasks yet to be completed comprises maintenance and/or inspection tasks to be performed with the engine of the oilfield pumping equipment turned on;
   receive a first input from a human user pertaining to one or more tasks of the adapted task workflow;
   receive a second input from one or more sensors disposed in association with one or more units of the oilfield pumping equipment used during performance of the oilfield operation, wherein the one or more sensors comprise pressure potentiometers, capacitance transducers, piezoresistive sensors, or electropneumatic transducers, and wherein the second input comprises a real-time analogue data stream;
   determine whether one or more of the tasks have been completed based on the received first and/or second input, wherein the first input pertaining to the one or more tasks comprises an interpretation of the second input;
   change the adapted task workflow based on the determination of whether the one or more tasks have been completed; and
   wirelessly transmit the received first input, the received second input, and the changed adapted task workflow to the server computer.

2. The non-transitory computer-readable medium of claim 1, wherein the first or second input comprises one or more numerical values falling outside of a predetermined range and wherein the computer executable instructions further cause the computer to display an alert regarding the one or more numerical values falling outside of the predetermined range.

3. The non-transitory computer-readable medium of claim 1, wherein the first or second input comprises a fail designation and wherein the computer executable instructions further cause the computer to add one or more previously completed tasks to the adapted task workflow.

4. A workflow management system comprising one or more sensors disposed in association with one or more units of oilfield equipment used in an oilfield operation, wherein the one or more sensors are configured to collect operating status of the associated unit(s), maintenance status of the associated unit(s), or both, wherein the workflow management system further comprises a mobile computer and a server computer, and wherein the server computer comprises:
   a processor; and
   a memory comprising program instructions executable by the processor to:
      receive a request to load a default task workflow and historical information for the oilfield equipment used in the oilfield operation;
      load the default task workflow and the historical information;
      generate an adapted task workflow by adapting the default task workflow with the historical information such that the adapted task workflow comprises tasks yet to be completed;
      divide the tasks yet to be completed into groups, wherein each group of tasks yet to be completed comprises maintenance and/or inspection tasks to be performed at a different corresponding stage of operations of the oilfield equipment;
      output the adapted task workflow to a video output device of the mobile computer to display the adapted task workflow arranged by the groups of tasks yet to be completed;
      receive an input transmitted wirelessly from the mobile computer pertaining to one or more tasks of the adapted task workflow, wherein the mobile computer is operable to receive the input from a human user, wherein the input is based on sensor data output by the one or more sensors, wherein the one or more sensors comprise pressure potentiometers, capacitance transducers, piezoresistive sensors, or electropneumatic transducers, wherein the mobile computer is communicatively connected with the one or more sensors and operable to receive the sensor data, and wherein the sensor data comprises one or more real-time analogue data streams relating to an operating status of the one or more units of the oilfield equipment, a maintenance status of the one or more units of the oilfield equipment, or both;
      determine whether the one or more tasks to which the received input pertains have been completed based on the received input;
      change the adapted task workflow based on the determination; and
      output the changed adapted task workflow to the video output device to display the changed adapted task workflow.

5. The workflow management system of claim 4, wherein the received input comprises a numerical value that falls within a specified range and wherein the one or more tasks to which the received input pertains are determined to be completed based on the numerical value that falls within the specified range.

6. The workflow management system of claim 4, wherein the received input comprises a numerical value that falls outside of a specified range and wherein the one or more tasks to which the received input pertains are determined to be completed based on a trend analysis of one or more past oilfield operations.

7. The non-transitory computer-readable medium of claim 1, wherein:
the computer executable instruction further cause the mobile computer to:
display the adapted task workflow;
periodically store the input at the server computer at a predetermined period of time; and
periodically store data regarding one or more tasks completed by a user at the server computer; and
the input comprises either:
one or more numerical values falling outside of a predetermined range, in which case the computer executable instructions further cause the mobile computer to display an alert regarding the one or more numerical values falling outside of the predetermined range; or
a fail designation, in which case the computer executable instructions further cause the mobile computer to add one or more previously completed tasks to the adapted task workflow.

8. The computer system of claim 4, wherein:
the adapted task workflow comprises one or more maintenance tasks; and
the input comprises either:
a numerical value that falls within a specified range, in which case the one or more tasks are determined to be completed based on the numerical value that falls within the specified range; or
the input comprises a numerical value that falls outside of a specified range, in which case the one or more tasks are determined to be completed based on a trend analysis of one or more past oilfield operations.

9. A communications interface device comprising an input device, a processor, and a memory storing a dedicated workflow application, wherein the dedicated workflow application comprises program instructions executable by the processor to:
display a list of oilfield equipment units;
receive, via the input device, a user selection of one of the listed oilfield equipment units;
wirelessly access a default task workflow and historical information from a server computer, wherein the default task workflow comprises a plurality of tasks of an oilfield operation associated with the user selected oilfield equipment unit, and wherein the historical information comprises a record of the tasks performed on the user selected oilfield equipment unit;
generate an adapted task workflow for the oilfield operation by changing the default task workflow based on the historical information by:
designating as completed one of the tasks of the default task workflow if the historical information is indicative that the one of the tasks was performed a predetermined number of times during a predetermined time period; and
designating as not completed the one of the tasks if the historical information is indicative that too much time has passed since the one of the tasks was last performed;
receive wirelessly transmitted sensor data output by sensors disposed in association with the user selected oilfield equipment unit during performance of the oilfield operation, wherein the sensors comprise pressure potentiometers, capacitance transducers, piezoresistive sensors, or electropneumatic transducers, and wherein the sensor data comprises one or more real-time analogue data streams; and
display the adapted task workflow.

10. The communications interface device of claim 9, wherein accessing the default task workflow and historical information is from a central hub via one or more networks.

11. The communications interface device of claim 9, wherein accessing the default task workflow and historical information is from the memory.

12. The communications interface device of claim 9, wherein generating the adapted task workflow comprises removing tasks which have already been completed for the oilfield operation, such that the adapted task workflow comprises uncompleted ones of the tasks of the default task workflow.

13. The communications interface device of claim 9, wherein the dedicated workflow application further comprises program instructions executable by the processor to receive user input that comprises user comments, media files, numerical values or combinations thereof, and wherein the media files comprise video files, audio files, or combinations thereof.

14. The non-transitory computer-readable medium of claim 1, wherein a third group of tasks yet to be completed comprises maintenance and/or inspection tasks to be performed after a previous cementing job was completed, and wherein a fourth group of tasks yet to be completed comprises validating completed ones of the maintenance and/or inspections tasks of the first, second, and third groups before commencement of a subsequent cementing job.

15. The non-transitory computer-readable medium of claim 1, wherein the computer-executable instructions further cause the mobile computer to change the default task workflow based on the historical information by:
designating as completed one of the tasks of the default task workflow when the historical information is indicative that that task was performed a predetermined number of times during a predetermined time period; and
designating that task as yet to be completed when the historical information is indicative that too much time has passed since the one of the tasks was last performed.

16. The workflow management system of claim 4, wherein a first one of the groups of tasks yet to be completed comprises maintenance and/or inspection tasks to be performed with an engine of the oilfield equipment turned off, and wherein a second one of the groups of tasks yet to be completed comprises maintenance and/or inspection tasks to be performed with the engine turned on.

17. The workflow management system of claim 4, wherein the program instructions are further executable by the processor to generate the adapted task workflow by:
designating as completed one of the tasks of the default task workflow when the historical information indicates that that task was performed a predetermined number of times during a predetermined time period; and
designating that task as yet to be completed when the historical information indicates that too much time has passed since that task was last performed.

18. The communications interface device of claim 9, wherein the program instructions are further executable by the processor to display the adapted workflow in groups of the tasks that have not been completed, wherein each group of tasks that have not been completed comprises maintenance and/or inspection tasks to be performed at a different corresponding stage of operations of the user selected oilfield equipment, wherein a first one of the groups of tasks that have not been completed comprises maintenance and/or inspection tasks to be performed with an engine of the user selected oilfield equipment turned off, and wherein a second one of the groups of tasks that have not been completed comprises maintenance and/or inspection tasks to be performed with the engine turned on.

19. The communications interface device of claim 9, wherein the wirelessly accessed default task workflow and historical information form a first input, wherein the communications interface device is further operable to receive a second input from one or more sensors disposed in association with the user selected oilfield equipment, and wherein the program instructions are further executable by the processor to determine whether one or more of the tasks have been completed based on the received first and second inputs.

* * * * *